United States Patent

Holz et al.

[11] Patent Number: 6,036,733
[45] Date of Patent: Mar. 14, 2000

[54] PROCESS FOR THE PREPARATION OF CRYSTALLINE SODIUM SILICATES

[76] Inventors: Josef Holz, Am Anger 24; Günther Schimmel, Ehrenstrasse 16, both of 50374 Erftstadt; Alexander Tapper, Kastanienweg 10, 41239 Mönchengladbach; Volker Thewes, Radstädter Weg 12, 40789 Monheim, all of Germany

[21] Appl. No.: 09/027,531

[22] Filed: Feb. 23, 1998

[30] Foreign Application Priority Data

Feb. 25, 1997 [DE] Germany .................. 197 07 448

[51] Int. Cl.$^7$ .................. B01D 9/00; C01D 1/30; C01B 33/00; C01B 33/32; C01B 33/20
[52] U.S. Cl. .................. 23/295 R; 23/300; 23/302 R; 23/302 T; 423/324; 423/325; 423/326; 423/332; 423/333; 423/334
[58] Field of Search .................. 423/332, 333, 423/334, 324, 325, 326; 23/295 R, 300, 302 T, 302 R

[56] References Cited

U.S. PATENT DOCUMENTS

| | | | |
|---|---|---|---|
| 4,585,642 | 4/1986 | Rieck | 423/333 |
| 4,806,327 | 2/1989 | Rieck et al. | 423/332 |
| 5,183,651 | 2/1993 | Schimmel | 423/334 |
| 5,211,930 | 5/1993 | Schimmel | 423/333 |
| 5,229,095 | 7/1993 | Schimmel et al. | 423/334 |
| 5,236,682 | 8/1993 | Schimmel | 423/334 |
| 5,268,156 | 12/1993 | Schimmel | 423/334 |
| 5,308,596 | 5/1994 | Kotzian | 423/333 |
| 5,356,607 | 10/1994 | Just | 423/334 |
| 5,456,895 | 10/1995 | Tapper et al. | 423/332 |

FOREIGN PATENT DOCUMENTS

| | | | |
|---|---|---|---|
| 0 293 640 B1 | 5/1988 | European Pat. Off. | C01B 33/32 |
| 0 436 835 A2 | 12/1990 | European Pat. Off. | C01B 33/32 |
| 0 502 325 A1 | 2/1992 | European Pat. Off. | C01B 33/32 |
| 0 548 599 A1 | 12/1992 | European Pat. Off. | C01B 33/34 |
| 0 425 428 B1 | 12/1993 | European Pat. Off. | C01B 33/32 |
| WO 95/19934 | 7/1995 | WIPO | C01B 33/38 |

OTHER PUBLICATIONS

Derwent Patent Family Report and/or Abstract of DE 4,401, 527 A.
Wasserglas und Folgeprodukte (pp. 54 to 63).

Primary Examiner—Gary P. Straub
Assistant Examiner—Eileen E. Nave

[57] ABSTRACT

The invention relates to a process for the preparation of crystalline sodium silicates having a sheet structure and high δ phase content from water glass, which has been prepared predominantly hydrothermally, by dehydration of the water glass and subsequent crystallization at elevated temperature, wherein the water glass is a mixture of water glass prepared hydrothermally and tank furnace water glass, and also to its use.

8 Claims, 2 Drawing Sheets

PROCESS FOR THE PREPARATION OF CRYSTALLINE SODIUM SILICATES

The invention relates to a process for the preparation of crystalline sodium silicates having a sheet structure and high δ phase content from water glass, which has been prepared predominantly hydrothermally, by dehydration of the water glass and subsequent crystallization at elevated temperature.

BACKGROUND OF THE INVENTION

Crystalline sodium silicates having a sheet structure are used as water softeners and builders in detergent and cleaning compositions. Crystalline sodium silicates having a sheet structure, in particular those having an $SiO_2:Na_2O$ molar ratio of (1.9 to 2.1):1, are suitable for this purpose. These are also referred to as SKS grades. Depending on the preparation and crystallization conditions, there are several modifications of this sodium silicate, referred to as α, β, γ and δ phases. For the above applications, the δ modification (SKS-6) is of particular interest.

The prior art already discloses a series of processes which can be used to prepare crystalline sodium silicates having a sheet structure.

EP 0 293 640 B1 describes a process for the preparation of crystalline sodium silicates having a sheet structure and an $SiO_2:Na_2O$ molar ratio of 1.9:1 to 3.5:1 from a water glass solution having a solids content of from 20 to 65% by weight, which comprises treating the water glass solutions in a spray-drying zone to form a pulverulent amorphous sodium silicate having a maximum ignition loss of 20% by weight, the waste gas leaving the spray-drying zone having a temperature of at least 140° C., and then heat-treating the spray-dried sodium silicate in an ignition zone containing an agitated fixed bed at temperatures of from 500 to 800° C. for from 1 to 60 minutes in the presence of at least 10% by weight of a recovered product which has been obtained by mechanical comminution of crystalline sodium silicate discharged from the ignition zone. It is a disadvantage of this process that to ensure trouble-free operation, a sufficiently large amount of the recovered product must be re-used. As a result, the process becomes complex.

EP 0 425 428 B1 likewise describes a process for the preparation of crystalline sodium silicates having a sheet structure and the aforementioned molar ratio and also a water content of less than 0.3% by weight from a water glass solution having at least 20% by weight of solids, which comprises obtaining the water glass solution by reacting quartz sand with sodium hydroxide solution, treating the water glass solution in a spray-drying zone at 200 to 300° C. and for a residence time of from 10 to 25 seconds, the temperature of the waste gas leaving the spray-drying zone being from 90 to 130° C., to form a pulverulent sodium silicate, which is then introduced into an inclined rotary kiln fitted with a solids agitation device and treated countercurrently with flue gas at temperatures of from 500 to 850° C. for a period of up to 60 minutes to form crystalline sodium silicate.

The rotary kiln is insulated in such a way that the temperature of its outer wall is less than 60° C. The crystalline sodium silicate leaving the rotary kiln is comminuted to particle sizes of from 0.1 to 12 mm using a mechanical crusher. The sodium silicate obtained by this process is mainly present in the δ modification.

A process for the preparation of crystalline sodium silicates having a sheet structure from sand and soda is described in EP-A-0 436 835. This involves melting sand and soda in an $SiO_2:Na_2O$ molar ratio of 2 to 3.5 at temperatures of from 1200 to 1400° C., cooling the melt, grinding the lumpy water glass formed to particle sizes of less than 2 mm and then treating the granules at from 600 to 800° C. in an elongate reaction zone with mechanical circulation for from 10 to 120 minutes and subsequently grinding them to a particle fineness of less than 1 mm. This process mainly produces α-$Na_2Si_2O_5$.

EP-A-0 502 325 describes a process similar to that in EP-A-0 425 428, except that a spray-dried pulverulent amorphous sodium silicate is ground before being introduced into the rotary kiln. In this process the waste gas leaving the rotary kiln has only a low dust content and the rotary kiln can be filled to a greater degree.

A further process variant, described in EP-A-0 548 509, is the process already described in EP-A-0 425 428, the difference being that the spray-dried pulverulent amorphous sodium disilicate is ground and, after grinding, is introduced into a rotary kiln, which is fitted with a solids agitation device and is heated externally via the wall and has several different internal temperature zones, and treated therein at temperatures of from 400 to 800° C. for from 1 to 60 minutes to form crystalline sodium disilicate. The product obtained is mainly the δ modification of $Na_2Si_2O_5$.

A disadvantage of all the above processes is that it is very difficult to prepare, under reproducible conditions, $Na_2Si_2O_5$ which consists of virtually 100% of the δ modification. Even a series of involved process steps is unable to achieve this aim completely.

The object of the present invention is, therefore, to provide a simple and economical process for reproducibly preparing crystalline sodium silicates having a sheet structure and an $SiO_2:Na_2O$ molar ratio of (1.9 to 2.1):1. The sheet silicate should have as high a δ phase content as possible.

DETAILED DESCRIPTION OF THE INVENTION

Figure 1:
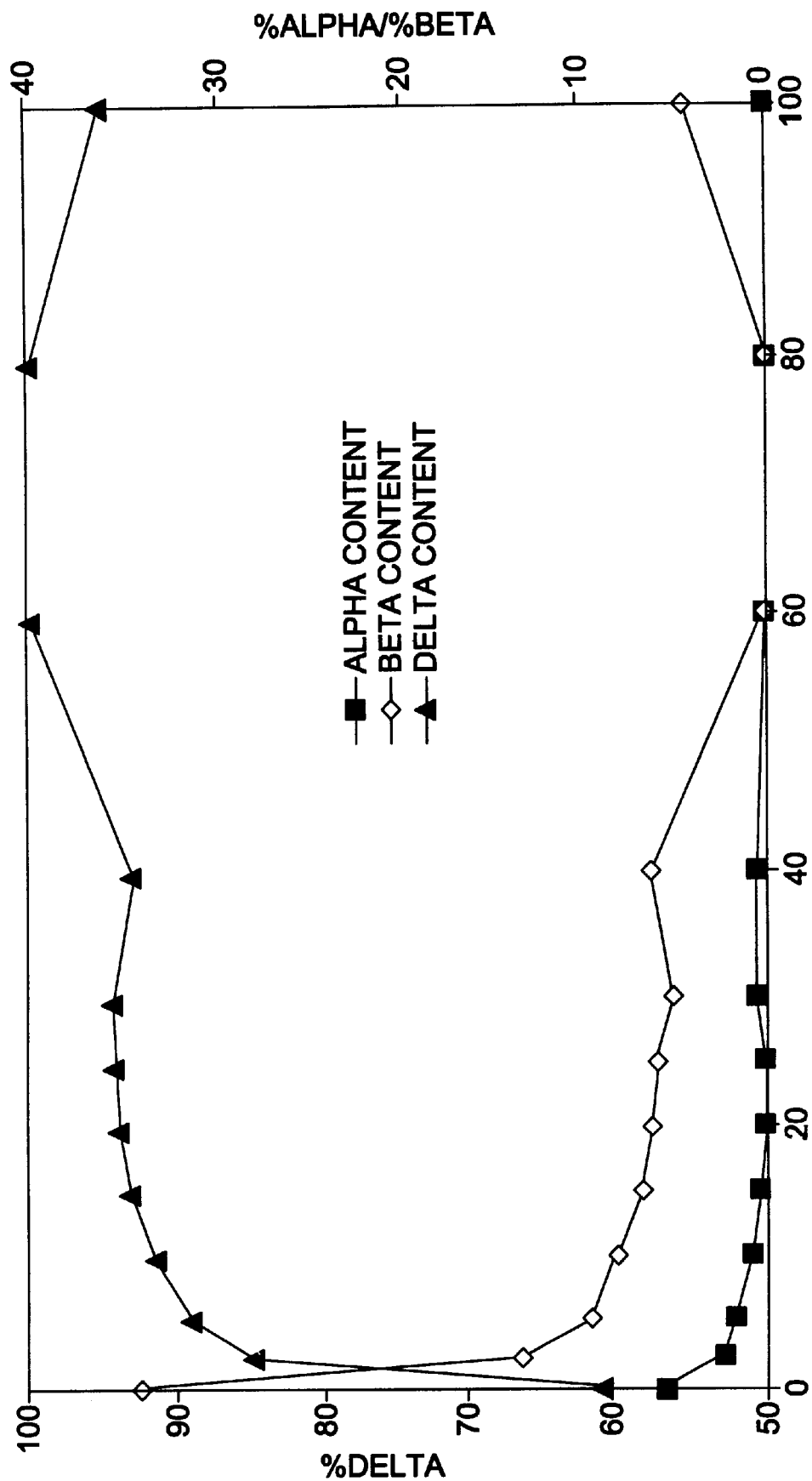
FIG. 1 shows the result of the novel preparation of crystalline sodium silicates with reference to the contents of the crystalline phases as a function of the ratio of tank furnace water glass to water glass prepared hydrothermally (heat-treated at 620° C.).

This object is achieved by a process of the type described at the beginning, wherein the water glass is a mixture of water glass prepared hydrothermally and tank furnace water glass.

Hydrothermal water glass is produced by the reaction of sand and sodium hydroxide solution according to the reaction equation

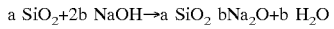

in pressurized containers at from 170 to 220° C. and the vapor pressure prevailing at this temperature. The reaction can be carried out in ordinary nickel auto-claves. This preparation process is described, for example, in EP 0 425 428 B1 and in Winnacker-Küchler, Volume 3, p. 61 et seq.

Tank furnace water glass is prepared by melting sand and soda at very high temperatures according to the reaction equation

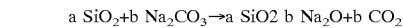

(Winnacker-Küchler, Volume 3, p. 57 et seq.). This reaction is carried out in lined tank furnaces. The resulting lumpy material is then dissolved at temperatures of from 130 to 160° C. to give a water glass solution. This is a two-stage process (melting at temperatures above 1400° C.), which requires a very large amount of energy and expensive apparatus. Moreover, it is necessary to purify the resulting solutions.

The mixture according to the invention preferably consists of from 0.5 to 50% by weight of tank furnace water glass and from 50 to 99.5% by weight of water glass prepared hydrothermally.

The mixture particularly preferably consists of from 1 to 20% by weight of tank furnace water glass and from 80 to 99% by weight of water glass prepared hydrothermally.

The mixture very particularly preferably consists of from 5 to 10% by weight of tank furnace water glass and from 90 to 95% by weight of water glass prepared hydrothermally.

The solids content of each water glass is preferably from 20 to 60% by weight.

The solids content of each water glass is particularly preferably from 40 to 50% by weight.

The water glass mixture is preferably dehydrated to give an amorphous sodium disilicate.

The amorphous sodium disilicate preferably has an ignition loss of from 10 to 25% by weight at 620 to 720° C.

Dehydration is preferably carried out in a hot-air spray tower.

The amorphous sodium disilicate is preferably crystallized at temperatures of at least 450° C., but below its melting point.

Crystallization is preferably carried out at temperatures of from 600 to 800° C.

The invention also relates to the use of crystalline sodium silicates having a sheet structure prepared by the process according to the invention for producing detergent, cleaning and dishwashing compositions.

In the following examples, an X-ray diffraction pattern of each sample is recorded and the X-ray reflections at the following d values are used for calculating the phase distribution:

| Angle [° 2 theta] | d value α1 [Å] |
|---|---|
| 25.802 | 3.45 |
| 27.997 | 3.30 |
| 30.063 | 2.97 |
| 30.698 | 2.91 |
| 34.474 | 2.84 |
| 36.040 | 2.49 |

The intensities of the X-ray reflections are inserted in the usual manner into the empirically determined formulae below (I=intensity, tot.=total):

Intensity (total)=I(3.30)+I(2.97)*1.8+[I(3.45)+I(2.91)+I(2.84)+I(2.49)]*1.89

α phase content in %=[I(3.30)*100]/tot. I

β phase content in %=[I(2.97)*180]/tot. I

δ phase content in %={[I(3.45)+I(2.91)+I(2.84)+I(2.49)]*189}/tot. I

EXAMPLE 1

Comparative Example 400 g of a commercially available water glass solution having an $SiO_2:Na_2O$ ratio of 2:1 and a solids content of 45% by weight, prepared by hydrothermal digestion of sand with sodium hydroxide solution, were dehydrated in a laboratory hot-air spray tower (inlet temperature 220° C., outlet gas temperature 120° C.) to give an amorphous sodium disilicate having an ignition loss of 16.8% by weight at 620° C. 8 g of the amorphous sodium disilicate were then heat-treated for 1 h in a muffle furnace at 620° C. and then rapidly cooled. The X-ray reflections (position and intensity) required for the phase calculation are given in Table 1. According to the above formulae, the percentage distribution among the crystalline phases is:

α phase content: 5.2%

β phase content: 34.1%

δ phase content: 60.7%

EXAMPLE 2

Comparative Example

The method of Example 1 is used. 400 g of another commercially available water glass solution (likewise prepared hydrothermally) were dehydrated in a laboratory hot-air spray tower (inlet temperature 220° C., outlet gas temperature 120° C.) to give an amorphous sodium disilicate having an ignition loss of 17.1% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to he above formulae, the percentage distribution among he crystalline phases is:

α phase content: 26.4%

β phase content: 43.1%

δ phase content: 30.5%

EXAMPLE 3

Comparative Example

Example 1 was repeated but using a commercially available tank furnace water glass solution having an $SiO_2:Na_2O$ ratio of 2 and a solids content of 45% by weight. Spray drying as in Example 1 produced an amorphous sodium disilicate having an ignition loss of 17.4% by weight at 620° C. 8 g of the amorphous sodium disilicate were then heat-treated for 1 h in a muffle furnace at 620° C. and then rapidly cooled. The X-ray reflections (position and intensity) required for the phase calculation are given in Table 1. According to the above formulae, the percentage distribution among the crystalline phases is:

α phase content: 0%

β phase content: 4.6%

δ phase content: 95.6%

EXAMPLE 4

Comparative Example

Example 3 was repeated; spray drying gave an amorphous sodium disilicate having an ignition loss of 17.7% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 0%
β phase content: 0%
δ phase content: 100%

EXAMPLE 5
Comparative Example

Example 1 was repeated but using a tank furnace water glass solution from another manufacturer having an $SiO_2:Na_2O$ ratio of 2 and a solids content of 55% by weight. Spray drying as in Example 1 produced an amorphous sodium disilicate having an ignition loss of 17.2% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 0%
β phase content: 0%
δ phase content: 100%

EXAMPLE 6
According to the Invention 400 g of a mixture comprising 80% by weight of water glass prepared hydrothermally (as in Example 2) and 20% by weight of tank furnace water glass (as in Example 3 or 4) were dehydrated in a laboratory hot-air spray tower (inlet temperature 220° C., outlet gas temperature 120° C.) to give an amorphous sodium disilicate having an ignition loss of 16.6% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 1.8%
β phase content: 3.9%
δ phase content: 94.3%

EXAMPLE 7
According to the Invention

Example 6 was repeated, but using 400 g of a mixture comprising 90% by weight of water glass prepared hydrothermally (as in Example 1) and 10% by weight of tank furnace water glass (as in Example 3 or 4). Spray drying as in Example 1 produced an amorphous sodium disilicate having an ignition loss of 16.7% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 0%
β phase content: 0%
δ phase content: 100%

EXAMPLE 8
According to the Invention

Example 6 was repeated but using 400 g of a mixture comprising 95% by weight of water glass prepared hydrothermally (as in Example 1) and 5% by weight of tank furnace water glass (as in Example 3 or 4). Spray drying as in Example 1 produced an amorphous sodium disilicate having an ignition loss of 16.1% by weight at 620° C. 8 g of the amorphous sodium disilicate were then heat-treated for 1 h in a muffle furnace at 620° C. and then rapidly cooled. The X-ray reflections (position and intensity) required for the phase calculation are given in Table 1. According to the above formulae, the percentage distribution among the crystalline phases is:

α phase content: 1.6%
β phase content: 9.2%
δ phase content: 89.2%

EXAMPLE 9
According to the Invention

Example 1 was repeated but using 400 g of a mixture comprising 98% by weight of water glass prepared hydrothermally (as in Example 1) and 2% by weight of tank furnace water glass (as in Example 3 or 4). Spray drying as in Example 1 produced an amorphous sodium disilicate having an ignition loss of 16.3% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 0.5%
β phase content: 6.3%
δ phase content: 93.2%

EXAMPLE 10
According to the Invention

Example 6 was repeated but using 400 g of a mixture comprising 95% by weight of water glass prepared hydrothermally (as in Example 1) and 5% by weight of tank furnace water glass (as in Example 5). Spray drying as in Example 1 produced an amorphous sodium disilicate having an ignition loss of 15.6% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 0.9%
β phase content: 0%
δ phase content: 99.1%

TABLE 1

X-ray reflections for Examples 1 to 10

| Example | Rel. intensity [%] at dα1 3.45 | Rel. intensity [%] at dα1 3.30 | Rel. intensity [%] at dα1 2.97 | Rel. intensity [%] at dα1 2.91 | Rel. intensity [%] at dα1 2.84 | Rel. intensity [%] at dα1 2.49 |
|---|---|---|---|---|---|---|
| 1 | 7.4 | 7.5 | 27.3 | 9.8 | 14.7 | 14.4 |
| 2 | 5.8 | 54.3 | 49.2 | 7.7 | 12.5 | 7.1 |
| 3 | 8 | 0 | 2.3 | 11 | 14.7 | 14.3 |
| 4 | 9.5 | 0 | 0 | 11 | 14.6 | 15.3 |
| 5 | 9.2 | 0 | 0 | 11.1 | 15.1 | 15.6 |
| 6 | 8.5 | 1.7 | 2 | 10.6 | 15 | 12.8 |
| 7 | 9.2 | 0 | 0 | 10.3 | 15.1 | 15 |
| 8 | 8.7 | 1.6 | 5.3 | 10.8 | 15.1 | 14.1 |
| 9 | 9.4 | 0.5 | 3.5 | 10.7 | 15.4 | 14.3 |
| 10 | 9.3 | 0.8 | 0 | 10 | 15.6 | 13.8 |

FIG. 1 below shows the result of the novel preparation of crystalline sodium silicates with reference to the contents of the crystalline phases as a function of the ratio of tank furnace water glass to water glass prepared hydrothermally (heat-treated at 620° C.).

Figure 2:
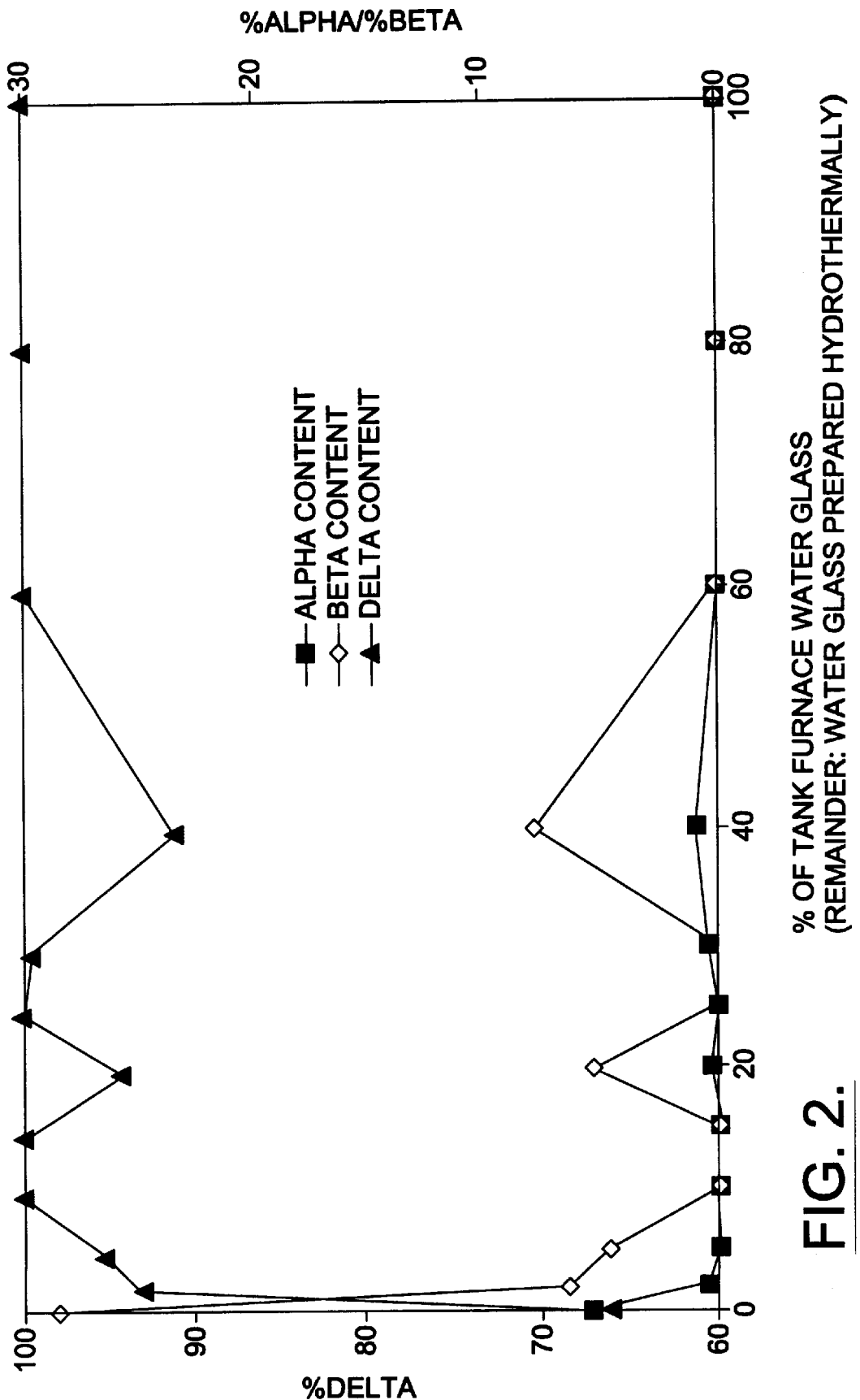
FIG. 2 shows the result of the novel preparation of crystalline sodium silicates with reference to the contents of the crystalline phases as a function of the ratio of tank furnace water glass to water glass prepared hydrothermally (heat-treated at 720° C.).

FIG. 2 shows the analogous result for heat treatment at 720° C.

What is claimed is:

1. In a process for the preparation of crystalline sodium silicates having a sheet structure and high δ phase content from hydrothermally prepared water glass, by dehydration of the water glass and subsequent crystallization at elevated temperature, the improvement which comprises:

adding 1 to 20% by weight of tank furnace water glass to the hydrothermally prepared water glass to form a mixture containing from 80 to 99% by weight of hydrothermally prepared water glass;

dehydrating the mixture;

and then heating the dehydrated mixture to at least 450° C. to its melting point to form crystalline sodium silicates having a δ phase content of greater than about 90%.

2. The process as claimed in claim 1, wherein the mixture consists of from 5 to 10% by weight of tank furnace water glass and from 90 to 95% by weight of water glass prepared hydrothermally.

3. The process as claimed in claim 1, characterized by a solids content of each water glass is from 20 to 60% by weight.

4. The process as claimed in claim 1, by a solids content of each water glass is from 40 to 50% by weight.

5. The process as claimed in claim 1, wherein the dehydration results in an amorphous sodium disilicate.

6. The process as claimed in claim 5, wherein the amorphous sodium disilicate has an ignition loss of from 10 to 25% by weight at 620 to 720° C.

7. The process as claimed in claim 1, which comprises carrying out the dehydration in a hot-air spray tower.

8. The process as claimed in claim 1, which comprises carrying out the crystallization at temperatures of from 600 to 800° C.

* * * * *